Sept. 21, 1965 G. P. DAVID ETAL 3,207,276
ACCELERATOR CANCELLING PEDAL
Filed April 29, 1963 2 Sheets-Sheet 1

INVENTORS
George Philip David &
BY Douglas Joseph Wing

J. L. Carpenter
ATTORNEY

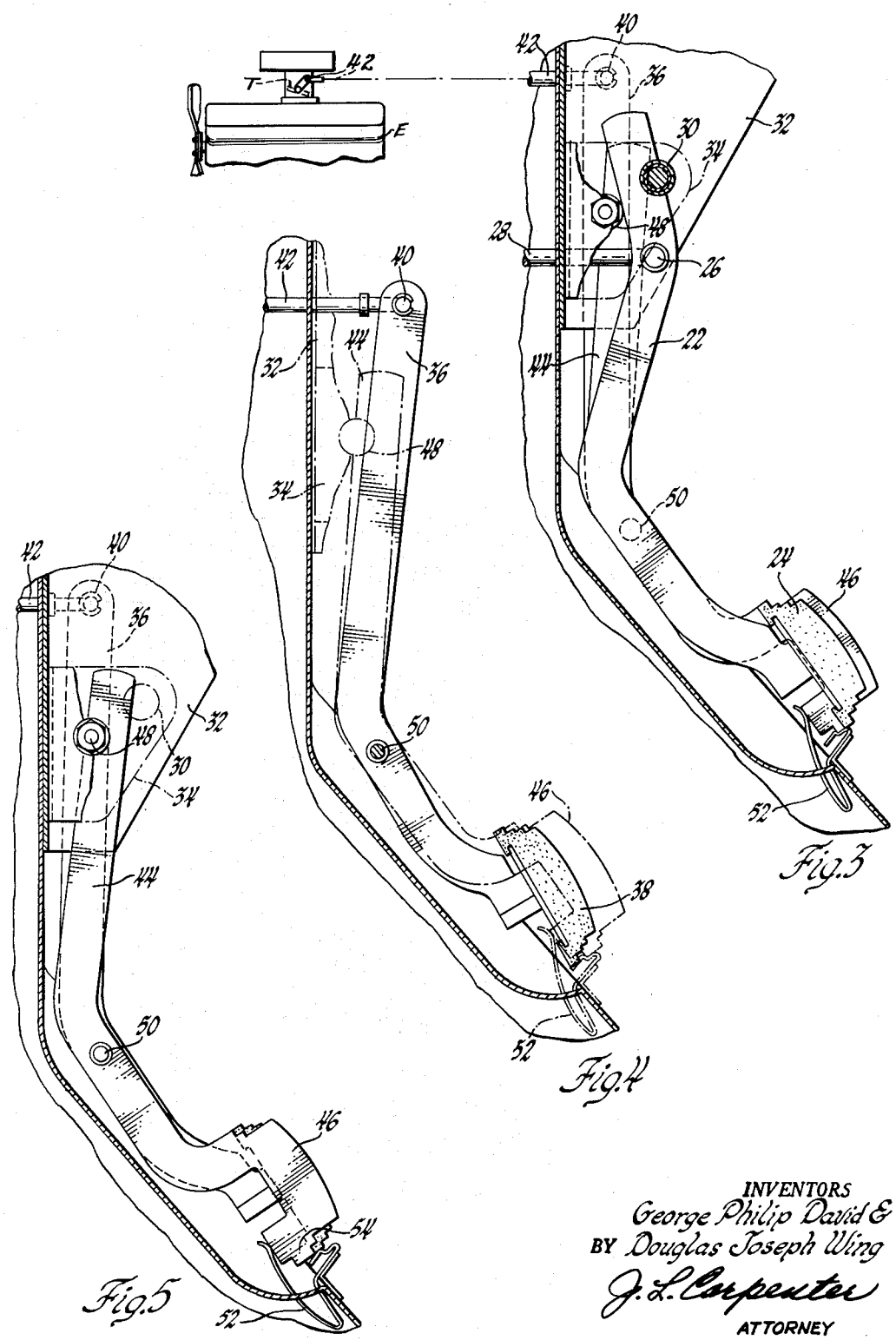

United States Patent Office 3,207,276
Patented Sept. 21, 1965

3,207,276
ACCELERATOR CANCELLING PEDAL
George Philip David, Middleburg Heights, Ohio, and Douglas Joseph Wing, St. Clair Shores, Mich., assignors to General Motors Corporation, Detroit, Mich., a corporation of Delaware
Filed Apr. 29, 1963, Ser. No. 276,431
5 Claims. (Cl. 192—3)

The present invention relates to a vehicle safety device whereby the effect of accelerator pedal operation on the vehicle throttle is cancelled in the event the vehicle operator simultaneously depresses both the accelerator pedal and the brake pedal with one foot.

With the elimination of clutches, due to the large use of automatic transmissions in recent years, brake and accelerator pedals have been disposed closer together and more nearly coplanar to facilitate their operation with relatively slight movement of one foot by the operator. However, this disposition of brake and accelerator pedals has created a problem, in that the operator's foot can engage both the accelerator and brake pedals at the same time. The result, of course, is that the operator in endeavoring to stop the car by depressing the brake pedal may also depress the accelerator pedal, thereby delivering more power to the wheels and creating an extreme hazard.

It is an object of the present invention to eliminate this hazard of accidental, simultaneous operation of the brake and accelerator pedals. More specifically, it is an object of the present invention to avoid the aforenoted simultaneous operation of brake and accelerator pedals by the provision of a safety pedal, also called a safety fence or cancellation bar, disposed between the accelerator and brake pedals and attached to the accelerator pedal, whereby when depressing both pedals with one foot the operator must depress the safety pedal and cancel the effect of the operation of the accelerator pedal on the vehicle throttle.

In the present invention the accelerator pedal is pivotally connected to the throttle rod mechanism which controls opening and closing of the engine throttle. However, instead of being mounted directly on the vehicle floor board, the accelerator pedal is supported by a safety pedal through a pivotal connection between the two. The safety pedal is pivotally mounted on the floor board proximate the connection of the accelerator pedal with the throttle rod. In normal operation, when the accelerator pedal is depressed it pivots about its pivotal connection with the safety pedal. The end of the throttle rod connected to the accelerator pedal swings about the pivotal connection with the safety pedal and operates the engine throttle. When the safety pedal is depressed with the accelerator pedal, the accelerator pedal no longer pivots about the pivotal connection with the safety pedal but instead swings about the connection of the accelerator pedal with the throttle rod. The end of the throttle rod connected to the accelerator pedal then remains stationary. The depression of the accelerator pedal will therefore have no effect on the engine throttle when the safety pedal is also depressed.

The details as well as other objects and advantages of the present invention will be apparent from the detailed description together with the drawings, in which:

FIGURE 3 is a view along lines 3—3 of FIGURE 2, further enlarged to show the details of the pedal mounting and in which the pedals are shown in nondepressed positions, also illustrating the connection of the accelerator pedal to the engine throttle;

FIGURE 4 is a similar view along line 4—4 of FIGURE 2, in which the accelerator pedal is shown in depressed position while the safety pedal is in nondepressed position; and FIGURE 5 is a similar view along line 5—5 of FIGURE 2, in which the safety pedal and accelerator pedal are shown in depressed positions.

Figures 1, 2:
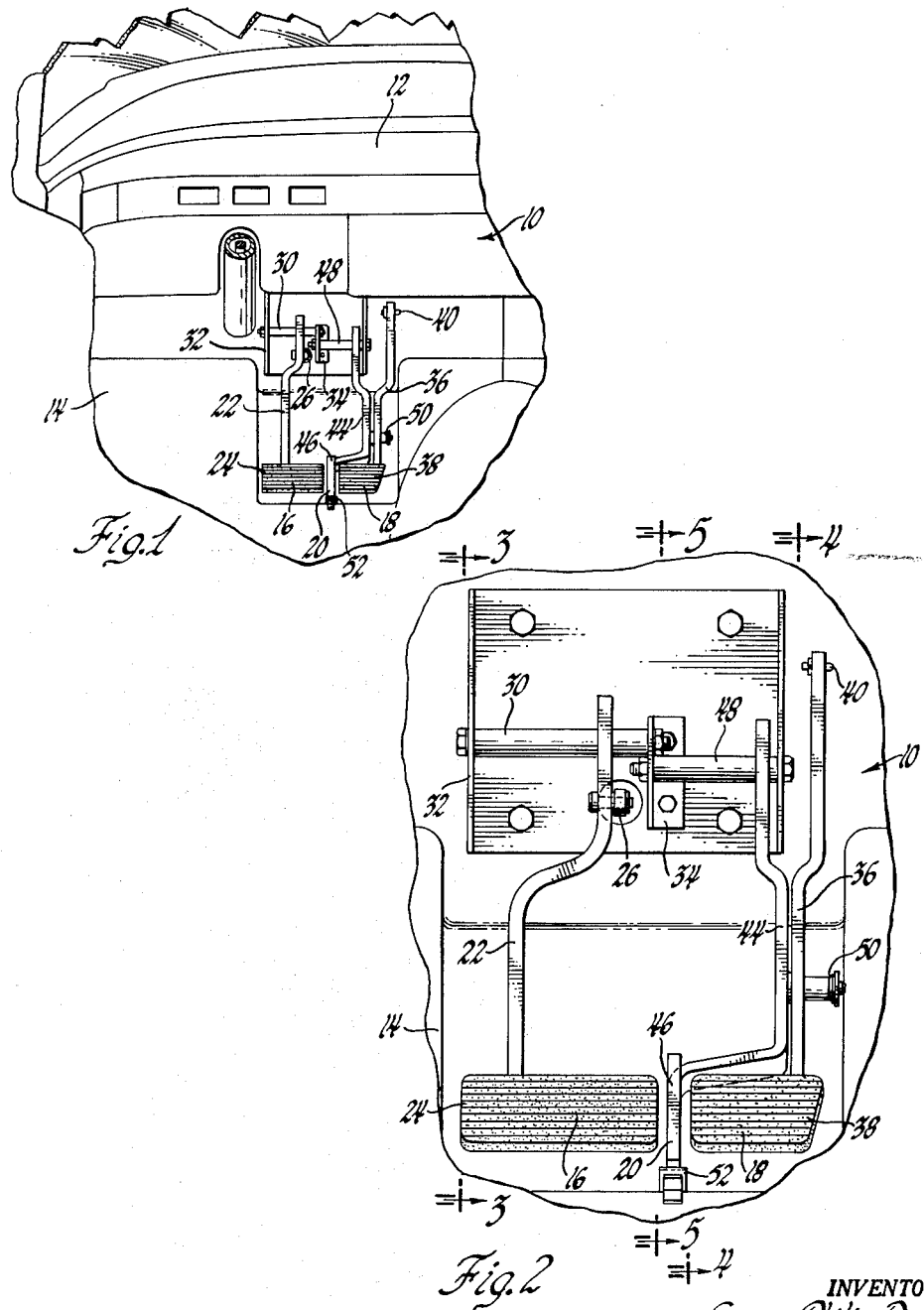
FIGURE 1 is a partial view of a vehicle passenger compartment showing the general disposition of the safety pedal in relation to the brake and accelerator pedals.
FIGURE 2 is an enlarged view of the pedal grouping of FIGURE 1.

Referring to FIGURE 1, a vehicle passenger compartment is indicated generally at 10 and includes a dash 12 and floor board 14. A compactly arranged vehicle control grouping is disposed proximate the floor board generally beneath the dash and includes brake pedal 16, accelerator pedal 18 and safety pedal 20.

Referring to FIGURES 2–5, brake pedal 16 comprises two parts: lever arm 22 and foot tread member 24 fixed on lever arm 22. Brake pedal 16 is connected at 26 to the appropriate brake controlling mechanism 28. Brake pedal 16 is pivotally mounted on floor board 14 by shaft 30 supported in brackets 32 and 34.

Accelerator pedal 18 also comprises two parts: lever arm 36 and foot tread member 38 fixed on lever arm 36. Accelerator pedal 18 is pivotally connected at 40 to the throttle rod mechanism 42 which controls opening and closing of the throttle T which in turn governs the speed of the vehicle engine E.

Safety pedal 20 comprises lever arm 44 with a foot receiving member 46 either integral with lever arm 44 or fixed on lever arm 44 in any suitable manner. Safety pedal 20 is mounted on floor board 14 by shaft 48 supported in brackets 32 and 34. Safety pedal 20 is pivotally connected to accelerator pedal 18 at an intermediate point 50 on lever arms 36 and 44.

It is necessary that the safety pedal 20 be biased toward the nondepressed position in order that normal operation of the vehicle will not be interrupted. The means disclosed herein comprises a spring 52 fixed in floor board 14. One end of spring 52 bears against the underside of member 46 urging safety pedal 20 toward the nondepressed position. From the end of member 46 a projection 54 extends substantially parallel to the underside of member 46. The other end of spring 52 is bent in the manner shown so that it bears against projection 54 resisting the displacement of safety pedal 20 from the nondepressed position. The strength of spring 52 is such that unless a force of approximately forty pounds is applied by the vehicle operator to safety pedal 20, safety pedal 20 will be retained in the nondepressed position.

It will thus be seen that during normal operation the accelerator pedal 18 pivots about the pivotal connection at point 50 with the safety pedal 20. The end of the throttle rod 42 connected to the accelerator pedal 20 swings about point 50 and operates the engine throttle. When the safety pedal 20 is depressed with the accelerator pedal 18, accelerator pedal 18 no longer pivots around point 50. Instead, the accelerator pedal 20 swings about the connection at 40 with the throttle rod 42 and the throttle rod 42 remains stationary. Therefore, the accelerator pedal 18 does not act upon the throttle rod 42 and the engine throttle is unaffected.

What is claimed is:
1. In an engine powered vehicle including a throttle for controlling carburetion and an accelerator foot pedal connected to said throttle and mounted for pivotal movement in a vertical plane, a vehicle control mechanism comprising a second foot pedal mounted for pivotal movement in a vertical plane proximate said accelerator pedal and pivotally supporting said accelerator pedal so as to render said accelerator pedal ineffective to control said throttle when said second pedal is depressed.

2. In an engine powered vehicle including a throttle for controlling carburetion, an accelerator foot pedal adapted to control said throttle, and a brake foot pedal disposed proximate said accelerator pedal so that the vehicle operator may depress said brake pedal by relatively slight movement of one foot from said accelerator pedal to said brake pedal, a vehicle control mechanism comprising a safety foot pedal supporting said accelerator pedal through a pivotal connection thereto so as to render said accelerator pedal ineffective to control said throttle when said safety pedal is depressed, said safety pedal being disposed between said brake and accelerator pedals so that said safety pedal will be depressed if both said brake and accelerator pedals are simultaneously depressed by one foot of said operator.

3. In an engine powered vehicle including a throttle for controlling carburetion, an accelerator foot pedal adapted to control said throttle, and a brake foot pedal disposed proximate said accelerator pedal so that the vehicle operator may depress said brake pedal by relatively slight movement of one foot from said accelerator pedal to said brake pedal, a vehicle control mechanism comprising a safety foot pedal pivotally supporting said accelerator pedal at the point of said accelerator pedal about which said accelerator pedal pivots to control said throttle so that said accelerator pedal is rendered ineffective to control said throttle when said safety pedal is depressed, said safety pedal being disposed between said brake and accelerator pedals so that said safety pedal will be depressed if both said brake and accelerator pedals are simultaneously depressed by one foot of said operator.

4. In an engine powered vehicle including a throttle for controlling carburetion, an accelerator foot pedal adapted to control said throttle, and a brake pedal disposed proximate said accelerator pedal so that the vehicle operator may depress said brake pedal by relatively slight movement of one foot from said accelerator pedal to said brake pedal, a vehicle control mechanism comprising a safety foot pedal pivotally supporting said accelerator pedal at the point on said accelerator pedal about which said accelerator pedal pivots to control said throttle so that said accelerator pedal is rendered ineffective to control said throttle when said safety pedal is depressed, said safety pedal being disposed between said brake and accelerator pedal so that said safety pedal will be depressed if both said brake and accelerator pedals are simultaneously depressed by one foot of said operator, and spring means to bias said safety pedal toward the nondepressed position.

5. In an engine powered vehicle including a throttle for controlling carburetion, an accelerator foot pedal pivotally connected at one end to the mechanism for controlling said throttle so as to be able to operate said mechanism, and a brake foot pedal disposed proximate said accelerator pedal so that the vehicle operator may depress said brake pedal by relatively slight movement of one foot from said accelerator pedal to said brake pedal, a vehicle control mechanism comprising a safety foot pedal pivotally mounted at one end on the vehicle floor board and pivotally supporting said accelerator pedal through a pivotal connection intermediate the ends of said safety pedal to said accelerator pedal at the point on said accelerator pedal intermediate the ends of said accelerator pedal about which point said accelerator pedal pivots to control said throttle so that said accelerator pedal is rendered ineffective to control said throttle when said safety pedal is depressed, said safety pedal being disposed between said brake and accelerator pedals so that said safety pedal will be depressed if both said brake and accelerator pedals are simultaneously depressed by one foot of said operator, and spring means bearing against the other end of said safety pedal to bias said safety pedal toward the nondepressed position.

References Cited by the Examiner

UNITED STATES PATENTS

| | | | |
|---|---|---|---|
| 1,470,211 | 10/23 | Baxter | 192—1 |
| 2,252,013 | 8/41 | Leupold | 74—564 |

FOREIGN PATENTS

| | | |
|---|---|---|
| 689,844 | 6/30 | France. |
| 601,212 | 8/34 | Germany. |
| 476,770 | 12/37 | Great Britain. |

DAVID J. WILLIAMOWSKY, *Primary Examiner.*